(12) United States Patent
Kiselev et al.

(10) Patent No.: US 11,204,322 B2
(45) Date of Patent: Dec. 21, 2021

(54) DEVICE AND METHOD FOR DETECTING AND/OR CHARACTERIZING FLUID-BORNE PARTICLES (71) Applicant: PLAIR SA, Plan-les-Ouates (CH)

(72) Inventors: Denis Kiselev, Perly (CH); Svetlana Kiseleva, Perly (CH)

(73) Assignee: Plair S.A., Perly (CH)

( * ) Notice: Subject to any disclaimer, the term of this patent is extended or adjusted under 35 U.S.C. 154(b) by 0 days.

(21) Appl. No.: 16/310,275

(22) PCT Filed: May 9, 2017

(86) PCT No.: PCT/EP2017/061070
§ 371 (c)(1),
(2) Date: Dec. 14, 2018

(87) PCT Pub. No.: WO2017/220249
PCT Pub. Date: Dec. 28, 2017

(65) Prior Publication Data
US 2019/0331601 A1  Oct. 31, 2019

Related U.S. Application Data (60) Provisional application No. 62/352,171, filed on Jun. 20, 2016.

(51) Int. Cl.
*G01N 21/64* (2006.01)
*G01N 15/14* (2006.01)
(Continued)

(52) U.S. Cl.
CPC ..... *G01N 21/6402* (2013.01); *G01N 15/1434* (2013.01); *G01N 15/1459* (2013.01);
(Continued)

(58) Field of Classification Search
CPC .......... G01N 21/6402; G01N 15/1434; G01N 15/1459; G01N 21/6408; G01N 21/6445;
(Continued)

(56) References Cited

U.S. PATENT DOCUMENTS 3,704,951 A * 12/1972 Chupp ................... G01N 21/65
356/301
3,825,325 A * 7/1974 Hartley .................. G01N 21/47
359/857

(Continued)

FOREIGN PATENT DOCUMENTS

JP         S59102139 A      6/1984

*Primary Examiner* — Mohamed K Amara
(74) *Attorney, Agent, or Firm* — Dinsmore & Shohl LLP; Weston R. Gould (57) ABSTRACT Measurement device for the detection and/or characterization of fluid-borne particles featuring a laser positioned for emitting pulses of laser light polarized in a first direction, in a measurement volume of a fluid flow path, each pulse having a pulse duration, and a means for directing the laser pulses polarized in a second different direction of polarization in the measurement volume. An optical spectrometer captures fluorescent light emitted by individual fluid-borne particles and measures the intensity of at least one wavelength at a sampling rate of at least three samples per pulse. The means for directing are configured to direct laser light polarized in the second direction each time a pulse of laser light crosses the measurement volume, the time delay between the two crossings being longer than the pulse duration and shorter than a travel time of the fluid in the measurement volume.

19 Claims, 8 Drawing Sheets (51) Int. Cl.
*G01N 15/10* (2006.01)
*G01N 21/47* (2006.01)

(52) U.S. Cl.
CPC ....... *G01N 21/645* (2013.01); *G01N 21/6408* (2013.01); *G01N 21/6445* (2013.01); *G01N 21/6486* (2013.01); *G01N 2015/1075* (2013.01); *G01N 2021/4761* (2013.01); *G01N 2021/6421* (2013.01); *G01N 2201/0697* (2013.01)

(58) Field of Classification Search
CPC ............. G01N 21/645; G01N 21/6486; G01N 2015/1075; G01N 2021/4761; G01N 2021/6421; G01N 2201/0697; G01N 2015/1006
See application file for complete search history.

(56) References Cited

U.S. PATENT DOCUMENTS

| | | | | |
|---|---|---|---|---|
| 4,345,837 A * | 8/1982 | Kallet | | G01N 21/031 356/244 |
| 4,348,107 A | 9/1982 | Leif | | |
| 4,752,922 A * | 6/1988 | MacAnally | | G11B 7/085 369/111 |
| RE33,213 E * | 5/1990 | Borden | | G01N 15/0205 250/574 |
| 5,442,487 A * | 8/1995 | Mizuno | | G02B 27/09 359/362 |
| 5,450,193 A * | 9/1995 | Carlsen | | A61B 5/083 356/246 |
| 5,760,900 A * | 6/1998 | Ito | | G01N 15/1434 356/338 |
| 6,393,039 B1 * | 5/2002 | Damask | | G02B 27/283 359/489.07 |
| 6,594,054 B1 * | 7/2003 | Dragone | | H04B 10/2507 398/147 |
| 7,193,706 B2 * | 3/2007 | Woodbury | | G01N 21/6408 356/317 |
| 7,251,026 B2 * | 7/2007 | Gilby | | G01N 21/645 356/246 |
| 7,456,954 B2 * | 11/2008 | Weiss | | G01J 3/4338 250/458.1 |
| 7,564,558 B2 * | 7/2009 | Martin | | G01J 3/22 356/246 |
| 7,820,984 B2 * | 10/2010 | Suzuki | | G01N 21/6452 250/458.1 |
| 7,843,572 B2 * | 11/2010 | Tearney | | A61B 5/0062 356/479 |
| 7,920,261 B2 * | 4/2011 | Jeys | | G01N 15/1434 356/338 |
| 8,319,965 B2 * | 11/2012 | Jeys | | G01N 15/1459 356/342 |
| 8,730,479 B2 * | 5/2014 | Ness | | G01N 21/05 356/436 |
| 8,867,046 B2 * | 10/2014 | Jeys | | G01B 11/002 356/614 |
| 9,354,178 B2 * | 5/2016 | Lee | | G01N 21/65 |
| 9,638,638 B2 * | 5/2017 | Huber | | H01S 3/10015 |
| 10,598,594 B2 * | 3/2020 | Scarcelli | | G01N 15/1429 |
| 10,866,182 B2 * | 12/2020 | Marks | | G01N 15/1436 |
| 2002/0063868 A1 * | 5/2002 | Florin | | G01N 15/1468 356/625 |
| 2002/0158212 A1 * | 10/2002 | French | | C12Q 1/6816 250/459.1 |
| 2003/0160151 A1 * | 8/2003 | Zarate | | G01N 21/6408 250/208.1 |
| 2003/0228703 A1 * | 12/2003 | Hoppe | | G01N 21/6458 436/172 |
| 2004/0089798 A1 * | 5/2004 | Gruber | | G01N 15/1459 250/251 |
| 2004/0159797 A1 * | 8/2004 | Wolleschensky | | G01J 3/02 250/458.1 |
| 2005/0112541 A1 * | 5/2005 | Durack | | C12N 5/0612 435/2 |
| 2006/0134775 A1 * | 6/2006 | Phillips | | G01N 21/6428 435/287.2 |
| 2008/0030716 A1 * | 2/2008 | Jeys | | G01N 21/53 356/73 |
| 2008/0049221 A1 * | 2/2008 | Wolleschensky | | G01N 21/6445 356/327 |
| 2008/0165337 A1 * | 7/2008 | Ershov | | G03F 7/70025 355/67 |
| 2008/0215272 A1 * | 9/2008 | Fujita | | G01N 21/6428 702/75 |
| 2009/0032449 A1 * | 2/2009 | Mueth | | G01N 33/487 210/94 |
| 2009/0075391 A1 * | 3/2009 | Fulghum, Jr. | | A61B 1/0669 436/164 |
| 2009/0122825 A1 * | 5/2009 | Ershov | | G03F 7/70583 372/57 |
| 2009/0125242 A1 * | 5/2009 | Choi | | G01N 21/45 702/19 |
| 2009/0231583 A1 * | 9/2009 | Smith | | G01J 4/04 356/367 |
| 2011/0222050 A1 * | 9/2011 | Suzuki | | G01N 15/1459 356/72 |
| 2012/0224183 A1 * | 9/2012 | Fay | | G01B 9/0209 356/491 |
| 2012/0267551 A1 * | 10/2012 | Dasgupta | | G01N 21/6445 250/453.11 |
| 2013/0029556 A1 | 11/2013 | Link | | |
| 2014/0030696 A1 * | 1/2014 | Luscher | | G01N 33/487 435/3 |
| 2014/0134608 A1 * | 5/2014 | Hanashi | | G01N 21/6408 435/5 |
| 2014/0220620 A1 * | 8/2014 | Durack | | A01N 1/0284 435/34 |
| 2014/0033944 A1 | 11/2014 | Tanabe | | |
| 2014/0339444 A1 * | 11/2014 | Tanabe | | G01N 21/6408 250/573 |
| 2014/0037779 A1 | 12/2014 | Dasgupta et al. | | |
| 2014/0377792 A1 * | 12/2014 | Dasgupta | | G01N 15/1459 435/29 |
| 2015/0031051 A1 * | 1/2015 | Mohan | | G01N 21/6458 435/7.24 |
| 2017/0131279 A1 * | 5/2017 | Link | | C12Q 1/6804 |
| 2017/0176318 A1 * | 6/2017 | Scarcelli | | G01N 15/1459 |
| 2017/0315045 A1 * | 11/2017 | Silcott | | G01N 15/1434 |
| 2017/0370699 A1 * | 12/2017 | Hogan | | G01B 9/02059 |
| 2018/0003623 A1 * | 1/2018 | Apolonskiy | | C07D 231/12 |
| 2018/0038784 A1 * | 2/2018 | Marks | | G01N 15/1425 |
| 2019/0033191 A1 * | 1/2019 | Kiselev | | G01N 15/1459 |

\* cited by examiner

DEVICE AND METHOD FOR DETECTING AND/OR CHARACTERIZING FLUID-BORNE PARTICLES

The present invention relates to a method and a device for detecting and/or characterizing fluid-borne particles using laser-induced fluorescence of said particles. The present invention relates in particular to a method and a device using time-resolved laser-induced fluorescence of fluid-borne particles for determining for example lifetime, lifetime anisotropy, and optionally fluorescence spectrum, of individual particles in a continuous flow of fluid.

The present invention relates to the field of precaution and/or protection means for detecting and/or characterizing fluid-borne particles, for example, but not exclusively, airborne particles such as air pollution, air bio- and chemical contamination and/or airborne allergen, water-borne particle such as water pollution, water bio- and chemical contamination, etc. The growing concentration of different types of aerosols in the atmosphere, for example the increasing number airborne pollens, becomes more and more an important public health issue. Moreover, new threats like bioterrorism that employs airborne biological and chemical pathogens like anthrax or mustard gas as an arm of massive destruction have recently appeared. Reliable, operator-free and cost-effective detectors of fluid-borne particles, for example aerosol detectors, fast and with a high discrimination power, are thus highly desirable in the market. In particular, there is a need for detectors allowing a real-time detection of particles present in a particular fluid environment, for example in the atmosphere, in a watercourse, in a drinking water distribution system, etc.

U.S. Pat. Nos. 5,270,548 and 5,315,122 for example describe apparatuses and methods for characterizing particles using, among others, time-resolved fluorescence of the particles following their submitting to laser light. A drawback of these apparatuses and methods is that the information that can be obtained about the nature and characteristics of individual particles is limited. In most of the cases, it only allows distinction between particles with slow fluorescence decay in the order of dozens of nanoseconds, generally attributed to non-biological particles containing hydrocarbons, against particles with short fluorescence decay in the order of a few nanoseconds or less, generally considered biological. Given only fluorescence decay, one can still find quite a large number of molecular compositions that would give a false response in this bio- and non-bio-classification.

An aim of the present invention is thus to provide a device and a method allowing a reliable and cost-effective detection and/or characterization of individual fluid-borne particles with a much more detailed measurement of fluorescence response and thus a much better identification of the chemical composition of individual particles and consequently a lower false count rate.

This aim and other advantages are achieved with a device and a method according to the corresponding independent claims.

This aim and other advantages are achieved in particular with a measurement device for the detection and/or characterization of fluid-borne particles, comprising means for producing a flow of fluid along a fluid flow path, a laser positioned for emitting pulses of laser light polarized in a first direction of polarization in a measurement volume of the fluid flow path, each pulse having a pulse duration, means for directing pulses of laser light polarized in a second direction of polarization in the measurement volume, wherein said second direction of polarization is different from said first direction of polarization, a first optical spectrometer for capturing fluorescent light emitted by individual fluid-borne particles in said measurement volume and measuring intensity of said captured fluorescent light at at least one determined wavelength at a sampling rate of at least three samples per said pulse duration, wherein the means for directing are configured such that they direct a pulse of laser light polarized in the second direction of polarization in the measurement volume each time a pulse of laser light emitted by the laser and polarized in the first direction has crossed the measurement volume, the time delay between the moment of crossing the measurement volume by the pulse emitted by the laser and the moment of crossing the measurement volume by the pulse directed by the means for directing is longer than the pulse duration and shorter than a travel time of the fluid in the measurement volume.

The second direction of polarization is for example perpendicular to the first direction of polarization.

In embodiments, the means for producing a flow of fluid is a nozzle for producing a laminar flow of air with a flow path beyond the nozzle. In other embodiments, the means for producing a flow of fluid comprises a transparent tube for producing a flow of liquid with a flow path along the tube.

The means for directing are for example a passive optical system configured for collecting pulses of laser light emitted by the laser after they have crossed the measurement volume and redirecting them towards the measurement volume again, and for rotating the polarization of the light of the pulses from the first direction of polarization to the second direction of polarization before redirected pulses reach the measurement volume again.

The means for directing are for example passive optical elements, comprising a first optical mirror located opposite the laser on the other side of the measurement volume for reflecting pulses of laser light emitted by the laser after they have crossed the measurement volume, a second optical mirror for reflecting pulses of laser light reflected by the first optical mirror and directing them in the measurement volume, an optical wave plate for rotating the direction of polarization of the laser light of the pulses by 90°, the optical wave plate being located on the path of laser pulses, either between the measurement volume and the first optical mirror, or between the first optical mirror and the second optical mirror, or between the second optical mirror and the measurement volume.

In embodiments, the first optical spectrometer is configured to measure the intensity of the collected fluorescent light at three different wavelengths with only one given polarization, preferably in the first direction.

The first optical spectrometer is for example configured for sampling the collected fluorescent light at a sampling frequency greater or equal to 500 MSPS (Mega samples per second), for example at a sampling frequency greater or equal to 1 GSPS (Giga samples per second).

In embodiments, the measurement device further comprises a second optical spectrometer for capturing fluorescent light emitted by individual fluid-borne particles with only one given polarization, preferably in the first direction in the measurement volume and determining the optical spectrum of the captured fluorescent light over a broad frequency range.

The measurement device of the invention thus allows the acquisition for each individual particle of spectrally and timely resolved fluorescence response on two laser pulses with different light polarisation and separated in time by a short delay. This is achieved thanks to a specific combination of fluid and light path geometries. It is also improved with ultrafast detectors and acquisition electronics.

This aim and other advantages are also achieved in particular with a measurement method for the detection and/or characterization of fluid-borne particles, comprising the steps of producing a flow of fluid along a fluid flow path, emitting a pulse of laser light polarized in a first direction of polarization in a measurement volume of the fluid flow path, the pulse having a pulse duration, collecting fluorescent light emitted by individual fluid-borne particles in the measurement volume when hit by the pulse of laser light polarized in the first direction of polarization, and measuring an intensity of said collected fluorescent light filtered with a linear polarizer, at at least one determined wavelength at a sampling rate of at least three samples per fluorescence decay duration, directing a pulse of laser light polarized in a second direction of polarization in the measurement volume, wherein the second direction of polarization is different from the first direction of polarization, such that the time delay between the moment of crossing the measurement volume by the pulse of laser light polarized in the first direction of polarization and the moment of crossing the measurement volume by the pulse of laser light polarized in the second direction of polarization is longer than the pulse duration and shorter than a travel time of the fluid in the measurement volume, capturing fluorescent light emitted by individual fluid-borne particles in the measurement volume and filtered by a linear polarizer when hit by the pulse of laser light polarized in the second direction of polarization, and measuring an intensity of the captured fluorescent light, filtered by a linear polarizer, at the at least one determined wavelength at a sampling rate of at least three samples per fluorescence decay duration.

The second direction of polarization is for example perpendicular to the first direction of polarization.

The filtering of the fluorescent emission by a linear polarizer is done to keep only one given polarization of said emission, preferably in the first direction, to allow further characterization of the fluorophore naute, as described later.

The fluid is for example air, another gas or gas mixture, or a liquid.

In embodiments, the step of directing comprises collecting the pulse of laser light polarized in a first direction of polarization after it crossed the measurement volume and redirecting it towards the measurement volume again, and rotating the polarization of the light of the pulse of laser light polarized in a first direction from the first direction of polarization to the second direction of polarization before the pulse reaches the measurement volume again.

In embodiments, the step of directing comprises reflecting the pulse of laser light polarized in a first direction of polarization after it crossed the measurement volume with a first optical mirror, reflecting the pulse of laser light reflected by the first optical mirror and directing it in said measurement volume with a second optical mirror, rotating the direction of polarization of the laser light of the pulse by 90° with an optical wave plate located on the path of the pulse of laser light, either between the measurement volume and the first optical mirror, or between the first optical mirror and the second optical mirror, or between the second optical mirror and the measurement volume.

In embodiments, the first optical spectrometer is configured to measure intensity of the captured fluorescent light at three different wavelengths for only one given polarization, preferably in the first direction.

In embodiments, the first optical spectrometer is configured for sampling the captured fluorescent light at a sampling frequency greater or equal to 500 MSPS (Mega samples per second), for example at a sampling frequency greater or equal to 1 GSPS (Giga samples per second).

In embodiments, the steps of capturing and measuring further comprise determining the optical spectrum of the fluorescent light over a broad frequency range for only one given polarization, preferably in the first direction.

According to a preferred embodiment, in order to simplify the implementation of the design, it is useful to couple the fluorescent light from particles into an optical fiber, preferably a single optical fiber, to transport the light towards spectrometer. This allows a good mechanical separation of light collecting and light measuring elements. In order to do so, i.e. to collect fluorescent light emitted from individual particles into an optical fiber, one add an element preferably made of transparent glass which is shaped in a way that all light coupled from the larger diameter side is guided to the lower diameter side by effect of total internal reflection total internal reflection. Among a plurality of geometries, three different geometries are preferred:
 a reflective objective lens with infinite back-focal length conjugated with an optical lens,
 a reflective objective lens with infinite back-focal length conjugated with parabolic reflector, and
 a reflective objective lens with infinite back-focal length conjugated with an optical taper.

The method of the invention thus provides a reliable and efficient approach of measuring fluorescence response in timely- and spectrally resolved ways.

The present invention will be better understood by reading the following description illustrated by the figures, where.

Figure 1:
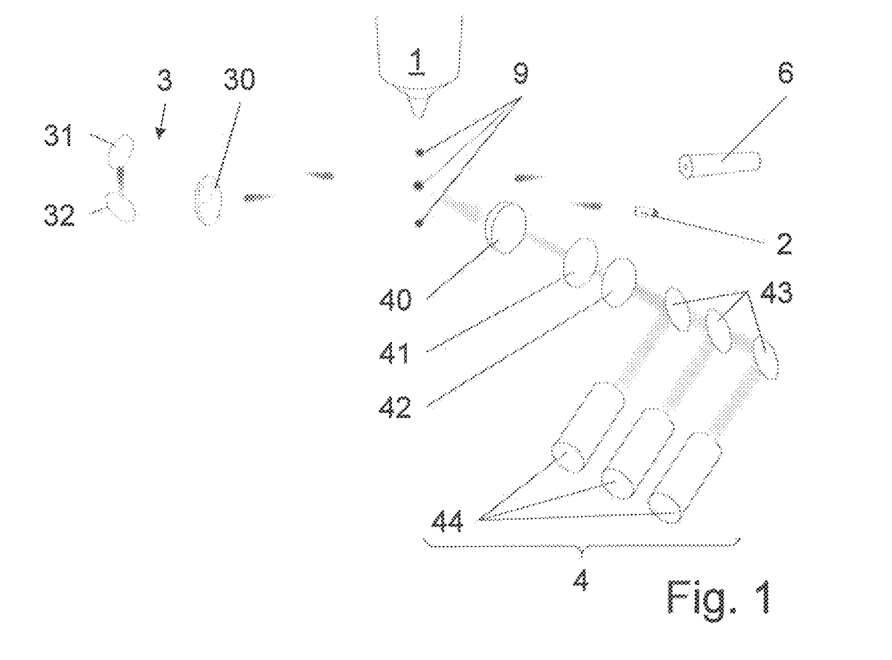
FIG. 1 is a schematic illustration of an embodiment of the device of the invention for the detection and/or characterization of airborne particles.

In embodiments, and with reference to FIG. 1, the device of the invention is configured for the detection and/or characterization of airborne particles contained in a flow of air, or in a flow of any other gaseous carrier.

With reference to FIG. 1, the device comprises a nozzle 1 for producing a laminar flow of air along a flow path beyond the nozzle 1, wherein the laminar flow of air potentially contains individual aerosol, or airborne, particles 9. The direction of the flow path is for example vertical. The device further comprises a source of light, for example a laser 2, for example a 263, 266, 337, 355 or 400 nm pulsed UV laser, which is positioned for emitting pulses of polarized laser light towards the airflow. The wavelength of the laser is chosen to allow the most efficient absorption, quantum yield and absorption cross section, and fluorescence emission. The wavelength may thus range from deep-UV to infrared and is not limited to the numbers mentioned above as examples. The volume of the airflow crossed by the pulses of laser light emitted by the laser 2 defines a measurement volume in which airborne particles 9 may interact with the laser light. The laser light emitted by the laser 2 is polarized along a first direction of polarization, for example in a vertical direction.

According to the embodiment illustrated in FIG. 1, the device of the invention comprises an optical system 3 comprising passive elements for reflecting the pulses of laser light after they crossed the measurement volume, and redirecting them into the measurement volume again. In the illustrated embodiment, the optical system 3 comprises a first optical mirror 31 located opposite the laser 2 on the other side of the measurement volume, and a second optical mirror 32 for redirecting the pulses of laser light reflected by the first optical mirror 31 towards the measurement volume. Accordingly, pulses of laser light emitted by the laser 2 cross the measurement volume a first time, are reflected by the first optical mirror 31 and by the second optical mirror 32, which redirects them in the measurement volume. Each pulse of laser light thus crosses the measurement volume twice, with a time delay between each crossing, which is determined by the length of the optical path travelled by the pulse of laser light between these two crossings. According to the invention, the optical system 3 further comprises means, for example a half-wave plate 30, for rotating the polarization of the laser light, for example by 90 degrees, before the pulse of laser light crosses the measurement volume for the second time. According to the invention, the polarization of the laser light is thus rotated from the first direction to a second direction different from the first direction. The wave plate 30 is positioned on the path of the laser light pulses, for example between the measurement volume and the first optical mirror 31, between the first optical mirror 31 and the second optical mirror 32, or between the second optical mirror 32 and the measurement volume.

In variant embodiments, the optical system comprises waveguides or other passive or active optical elements for redirecting the pulses of laser light emitted by the laser towards the measurement volume again and/or for introducing a determined time delay in the travel path of the laser light, and/or for rotating the polarization of the laser light.

In variant embodiments, the optical system comprises one laser for which the optical path is divided in two or more paths with different optical lengths before the first crossing of the measurement volume. However, in such embodiments each laser pulse is divided in multiple sub-pulses, each containing only a portion of the energy of the laser output pulse. This may be a limiting factor for efficient excitation of fluorescence response leading to degradation of signal-to-noise ratio.

Alternatively, the device of the invention might comprise two lasers emitting pulses of laser light with different directions of polarization in the same measurement volume. Such a solution however requires a very precise synchronization of both lasers to achieve a precise and exactly reproducible time delay between the emission of a pulse of laser light by the first laser and the emission of a pulse of laser light by the second laser, which is probably not achievable with current reasonably priced lasers.

According to the invention, the device further comprises a first optical spectrometer 4 for providing time-resolved information about fluorescent light at at least one wavelength emitted by particles 9 in the measurement volume when hit by a pulse of laser light. The first optical spectrometer 4 for example comprises a linear polarizer 42 to filter out unwanted light polarizations and preferably only keep light polarized in the first direction, for example the vertically polarized light, dichroic mirrors 43, for example three dichroic mirrors 43, for separating the fluorescent light in spectral ranges, for example in three spectral ranges, and photodetectors 44, for example three photodetectors 44, each photodetector 44 capturing the fluorescent light of one of the spectral ranges, reflected by one of the dichroic mirrors 43. Preferably, each spectral range is centred on a determined wavelength of interest, corresponding for example to a wavelength of fluorescent light emitted by a particular type of endogenous fluorophore or fluorescence labelling marker of particle 9. For the sake of clarity, it is assumed in the present description that the particles measured by the method and device of the invention can be natural or artificial biological and non-biological particles having any fluorescence response to the absorbed laser light.

As explained further below, the photodetectors 44 of the first spectrometer 4 are fast detectors that can sample the received light at a sampling rate sufficiently high for obtaining several measurement points of the light intensity during the time of fluorescence decay, which in all cases is much shorter than the time of crossing the measurement volume by a fluid-borne particle 9.

In the illustrated example, the first optical spectrometer 4 separates the received fluorescent light in three spectral ranges. The number of spectral ranges, as well as their bandwidth and their central wavelength, can however vary depending on the nature of the fluid-borne particles 9 to be detected and/or characterized.

Preferably, the first optical spectrometer 4 can be configured for measuring fluorescent light at other wavelength, or replaced by another first optical spectrometer with spectral ranges centred on other wavelengths, for detecting and/or characterizing different particles 9. The spectrometer 4 is for example configurable in that the number and types of dichroic mirrors 43 are modified.

The first optical spectrometer 4 preferably comprises a first optical lens set 40 for collecting fluorescent light emitted by particles 9 in the measurement volume and for directing it to the dichroic mirrors 43.

In embodiments, the first optical spectrometer 4 comprises a lowpass filter 41, located for example between the lens set 40 and linear polarizer 42, for filtering fluorescent light emitted by particles 9 in the measurement volume from scattered light of the laser 6.

The device of the invention preferably further comprises a signal analyser, which is not illustrated in the figures, for receiving output signals from the first optical spectrometer 4 and using them for providing information to a user, such as for example a time resolved fluorescence information at different wavelengths for the particle 9 that was hit by the pulse of laser light, an indication of the speed of the particle 9, etc., as explained further below. In embodiments, the device of the invention comprises a photodetector, for example a photodiode 6, for detecting pulses of laser light emitted by the laser 2 after they crossed the measurement volume for the second time. The output signal of the photodiode 6 is for example transmitted to the signal analyser that can thus be informed of the emission of a pulse of laser light and/or of the intensity and/or duration of the emitted pulse. In embodiments, the signal analyser generates control signals for controlling the laser 2, in particular the emission or not of one or more pulses of laser light.

Figure 2:
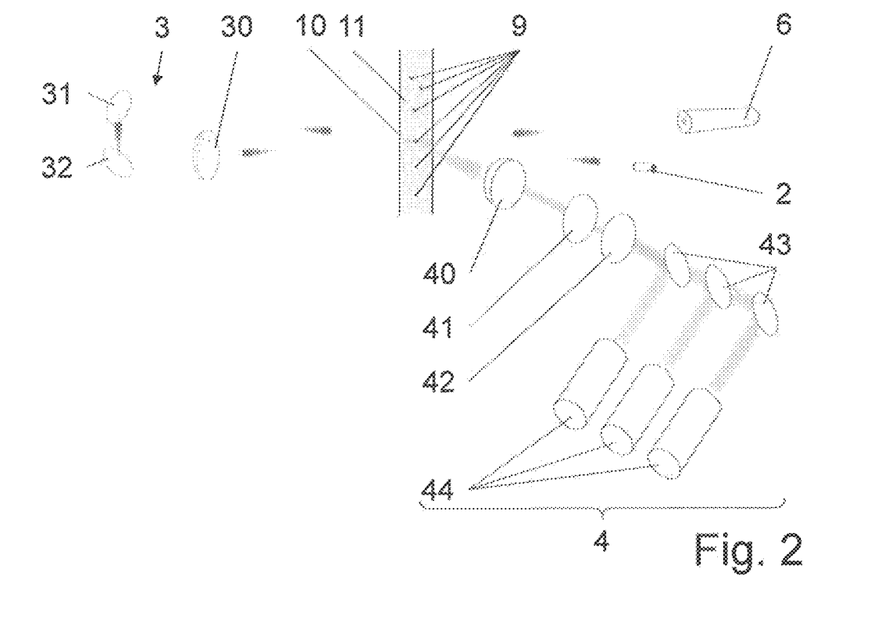
FIG. 2 is a schematic illustration of the device of FIG. 1, adapted for the detection and/or characterization of liquid-borne particles.

The device of the invention is described above for the detection and/or characterization of aerosols particles 9 present in a flow of gas, for example in an airflow, formed by a nozzle 1. In embodiments, illustrated by way of example in FIG. 2, the device of the invention is configured for detecting and/or characterizing fluid-borne particles present in a fluid, i.e. in a gas or in a liquid, whereas the fluid is preferably transparent to laser light. The device of the invention as illustrated by way of illustrating but in no way limiting example in FIG. 2 is for example configured for detecting and/or characterizing water-borne particles. Accordingly, the device of the invention comprises a fluid guide, for example a linear tube 10, along which, for example inside which, a fluid 11 flows, which potentially bears particles 9. The intersection of the pulses of polarized laser light emitted by the laser 2 with the fluid 11 defines a measurement volume in which individual fluid-borne particles 9 may interact with the pulses of laser light. The other elements of the device of the invention and their functions are the same as the ones described above and illustrated in FIG. 1 in relation with the detection and/or characterization of airborne particles, the only difference being the means for producing the flow of fluid along a fluid flow path.

Unless otherwise specified, same reference signs designate same elements in the various figures.

Figure 3:
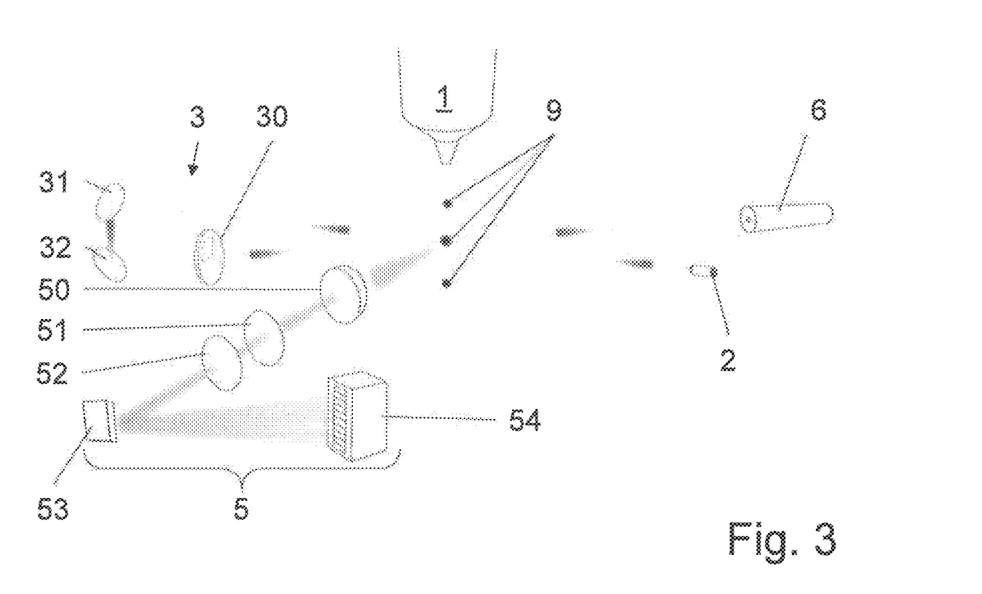
FIG. 3 is a schematic illustration of another embodiment of the device of the invention for the detection and/or characterization of airborne particles.

Alternatively, and with reference to FIG. 3, the device of the invention comprises an optical spectrometer 5 comprising a lens set 50 for collecting fluorescent light emitted by a fluid-borne particle 9, for example an airborne particle, hit by a pulse of laser light in the measurement volume, a lowpass filter 51 for filtering fluorescent light emitted by particles 9 in the measurement volume from scattered light of the laser 6, a linear polarizer 52 for keeping only one light polarization preferably in the first direction, for example vertical, a diffraction grating 53 to spread the collected fluorescent light into a spectrum, and image it on an array photodetector 54 for sampling the spread fluorescent light over the entire spectrum.

The device of the invention preferably further comprises a signal analyser, which is not illustrated in the figures, for receiving output signals from the optical spectrometer 5 and using them for providing information to a user, such as for example spectrally resolved fluorescence information for the particle 9 that was hit by the pulse of laser light. In embodiments, the device of the invention comprises a photodetector, for example a photodiode 6, for detecting pulses of laser light emitted by the laser 2 after they crossed the measurement volume for the second time. The output signal of the photodiode 6 is for example transmitted to the signal analyser that can thus be informed of the emission of a pulse of laser light and/or of the intensity and/or duration of the emitted pulse. In embodiments, the signal analyser generates control signals for controlling the laser 2, in particular the emission or not of one or more pulses of laser light.

Figure 4:
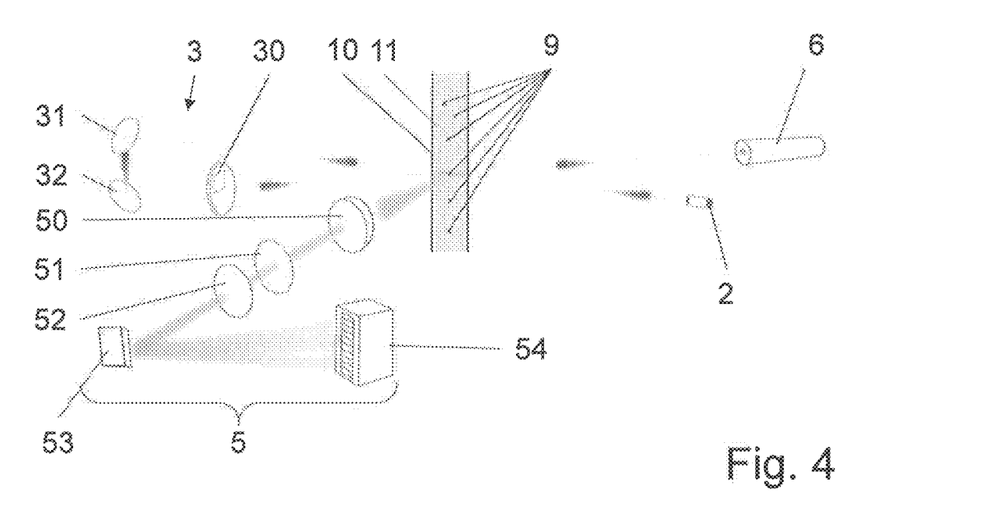
FIG. 4 is a schematic illustration of the device of FIG. 3, adapted for the detection and/or characterization of liquid-borne particles.

FIG. 4 shows as an example the device of FIG. 3 configured for detecting and/or characterizing fluid-borne particles present in a fluid, i.e. in a gas or in a liquid, i.e. with a tube 10 instead of the nozzle 1 of the embodiment of FIG. 4.

Figure 5:
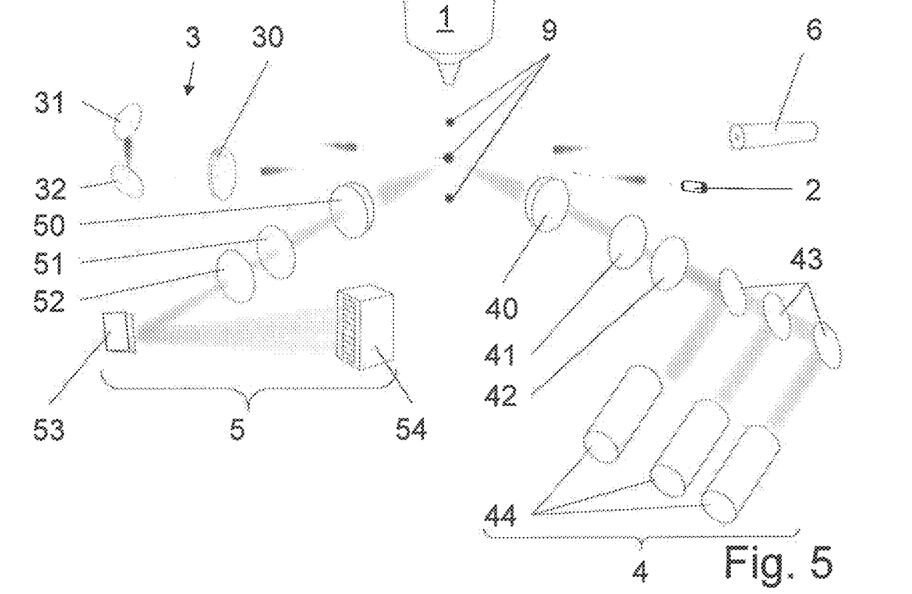
FIG. 5 is a schematic illustration of yet another embodiment of the device of the invention for the detection and/or characterization of airborne particles.

In embodiments, and with reference to FIG. 5, the device of the invention comprises two spectrometers 4 and 5. A first optical spectrometer 4 providing time-resolved information about the fluorescent light emitted by individual particles 9 hit by pulses of laser light in the measurement volume, and a second optical spectrometer 5 providing spectrally-resolved information about this fluorescent light. The second optical spectrometer 5 for example comprises a second optical lens set 50 for collecting fluorescent light emitted by individual particles 9 in the measurement volume, a lowpass filter 51 for filtering fluorescent light emitted by particles 9 in the measurement volume from scattered light of the laser 6, a linear polarizer 52 for keeping only one light polarization preferably in the first direction, for example vertical, a diffraction grating 53 to spread the collected fluorescent light into a spectrum, and a photodetector, for example an array photodetector 54, for sampling the light over the entire spectrum.

Figure 6:
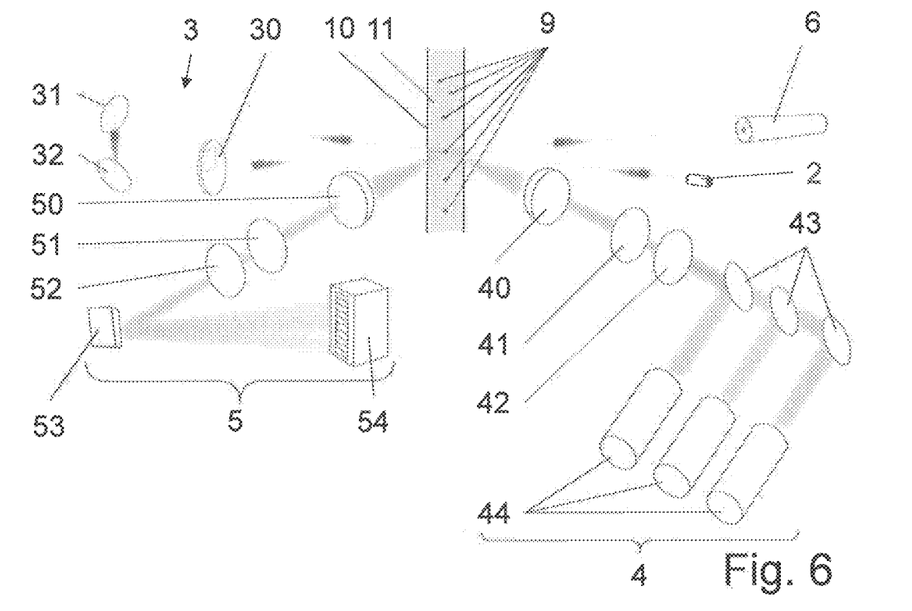
FIG. 6 is a schematic illustration of the device of FIG. 5, adapted for the detection and/or characterization of liquid-borne particles.
Figure 7A:
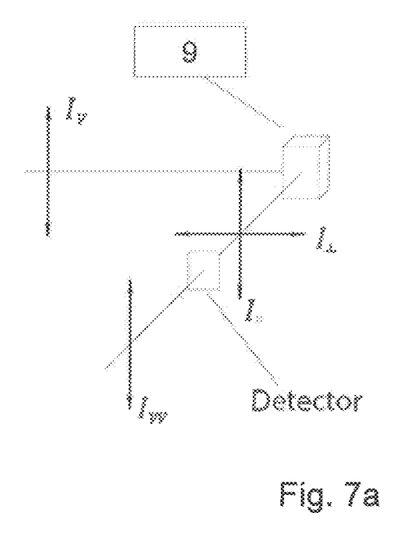
FIGS. 7a and 7b schematically illustrate the basic physical principles of the light-matter interation.
Figure 7B:
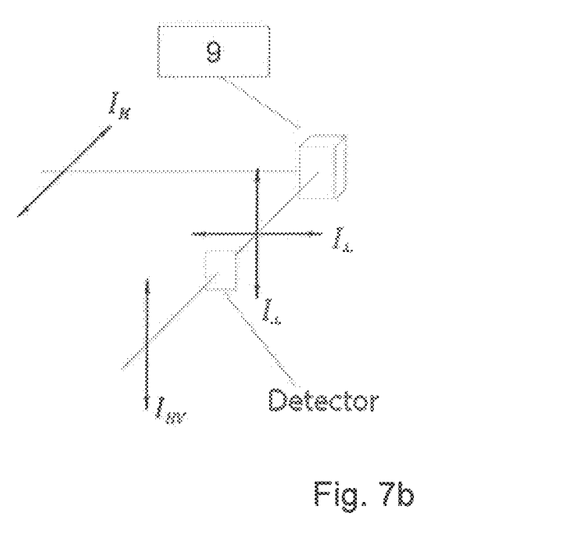

FIG. 6 illustrates a device of the invention similar to the one illustrated in FIG. 5, but adapted to the detection and/or characterization of fluid-borne particles present in a fluid, i.e. in a gas or in a liquid, whereas the fluid is preferably transparent to laser light. The device of the invention as illustrated by way of illustrating but in no way limiting example in FIG. 6 is for example configured for detecting and/or characterizing water-borne particles. Accordingly, the device of the invention comprises a fluid guide, for example a linear tube 10, along which, for example inside which, a fluid 11 flows, which potentially bears particles 9. The intersection of the pulses of polarized laser light emitted by the laser 2 with the fluid 11 defines a measurement volume in which individual fluid-borne particles 9 may interact with the pulses of laser light. The other elements of the device of the invention and their functions are the same as the ones described above and illustrated in FIG. 5 in relation with the detection and/or characterization of airborne particles, the only difference being the means for producing the flow of fluid along a fluid flow path. Unless otherwise specified, same reference signs designate same elements in the various figures.

In the following paragraphs, the functioning of the device of the invention and the corresponding method for detecting and/or characterizing fluid-borne particles is described and illustrated for the special case of the detection and analysis of airborne particles. The functioning and method described herein however also applies to the detection of any fluid-borne particle.

According to the invention, the detection and/or characterization method is based on the laser-induced fluorescence measured by time-resolved, and optionally spectrally-resolved, techniques.

The method of the invention comprises shooting a pulse of laser light with the laser 2 on an individual fluid-borne particle 9 present in the fluid flow while said fluid-borne particle 9 crosses the measurement volume, and then directing a pulse of laser light polarized in another direction and with a determined time delay on the same fluid-borne particle 9 while it is still in the measurement volume. In embodiments, the optical path of the laser pulse emitted by the laser 2 is folded back onto the measurement volume with a given delay and modified laser polarization, for example with an optical system 3 as illustrated in the FIGS. 1 to 6.

During the first pass or crossing, i.e. during the first interaction of the laser pulse with the fluid-borne particle 9, the orientation of molecular dipoles inside the particle 9 is arbitrary and uniform. The laser pulse during its first pass in the measurement volume will interact only with molecules of the particle 9 that are aligned with its electric field, and will excite them. Some of these molecules will emit one photon after some time, usually after 0.1 to 3 ns for most biological particles. These photons are detected by the first, time-resolved, optical spectrometer 4, which measures the decay of fluorescent light at at least one wavelength. Optionally, the method further includes using the second, spectrally resolved and relatively slow, optical spectrometer 5 for determining the entire fluorescent spectral range of the fluorescent light emitted by the fluid-borne particle 9.

In embodiments, after hitting an individual fluid-borne particle 9 a first time, the laser pulse will travel some distance and shine the same particle 9 again after a time delay of for example 6 to 10 ns, the delay being defined by the distance travelled by the laser pulse between two successive passes, or crossings, of the measurement volume. The time delay between two hits, or two crossings, is preferably shorter than the travel time of the individual particle 9 through the measurement volume, such that at the second pass, the laser pulse interacts again with the same particle 9. In the optical system 3, the laser pulse will also cross for example a half-wave plate 30 that will rotate the electric field, or polarization, of the laser light by 90 degrees. During the second crossing, the electrical field of the laser pulse will interact once again with molecular dipoles of the particle 9. During the first interaction of the laser pulse and the particle, the molecular dipoles of molecules contained in the particle will align with the direction of electric field of the laser light. Depending on molecule size and surrounding environment, this phase alignment of the dipole rotations will be kept for few picosecond up to dozens of nanoseconds. Together with relaxation times of excited electronic states, this effect will lead to a different absorption efficiency during the second crossing of the laser pulse. Indeed, this efficiency will be affected simultaneously by the number of available molecules already returned into ground state, ready for another electronic excitation, and the number of the available molecular dipoles aligned in the same direction that the electric field of the laser light during second crossing, thus 90 degrees rotated to the initial laser polarization. This combined measurement of fluorescence response with two laser pulses and two decays provides much more detailed information on molecular composition, compared to standard spectroscopy or standard fluorescence lifetime measurement, because the method and device of the invention is simultaneously sensitive to the fluorescence lifetime decay related to the excited electronic levels and to the molecular dipole alignment thanks to the 90 degrees rotation of the laser electric field between two interactions with the particle. This fact provides possibility to directly measure and estimate fluorescence anisotropy which reveals whether the sample is sensitive to different polarizations of excitation light source. The fluorescence anisotropy is a powerfull tool to probe molecular motion, which is largely influenced by the molecular weight and size. It also gives access for studies of molecular rotational diffusion and internal flexibility. All this facts brings additional degrees of freedom for individual airborne particle identification.

The method of the invention thereby allows probing of spectral properties of dominant fluorophore(s) in the particle and eventually access to a better understanding of molecular composition, molecule size and surrounding.

The main physical principle underlying the method of the invention is described on FIGS. 7*a* and 7*b* that remind the classical L-shape fluorescence anisotropy measurement scheme. There are however two main distinctions compared to it: a) a linear polarizer is introduced into the optical path of the detector to keep only one given polarization of the fluorescent light emitted by the particle 9, b) the interaction of the particle 9 with the laser pulse is done in two steps, a first step with the laser light polarized in a first direction and a second step with the laser light polarized in a second direction different from the first direction, with a delay between the two interactions that can be of order or even shorter than the fluorescence lifetime. FIG. 7*a* illustrates for example a first interaction where the laser light polarization is vertical. The detected signal can be in general described as follows:

$$I_{d1}(t) = I_{VV}(t) = I_{01} \cdot e^{-\frac{t}{\tau_1}}$$

Where $l_{VV}$ is the vertical polarization component of the fluorescence emitted by the sample excited by the vertically polarized laser light, $l_{01}$ is the signal amplitude at t=0, and $\tau_1$ is the decay constant. FIG. 7*b* illustrates a second interaction where the laser light polarization is for example horizontal. The detected signal can be in general described as follows:

$$I_{d2}(t) = I_{HV}(t) = I_{02} \cdot e^{-\frac{t}{\tau_2}}$$

Where $l_{HV}$ is the vertical polarization component of the fluorescence emitted by the sample excited by the horizontally polarized laser light.

According to the method of the invention, two possible scenario of interaction of the laser light with the sample may occur, that are represented on FIGS. 8*a* and 8*b*. According to the first scenario illustrated in FIG. 8*a*, the fluorophore molecules in the sample have initially random orientation of transition moments when first interacted with the laser light polarized in the first direction, for example vertically. The total number of these fluorophores is denoted by $N_T$. The probability of transition to an excited electronics state is higher for the molecules with transition moments aligned in the same direction as the electric field of the laser light, i.e. the first direction, or in a close direction. After some time, the excited molecules $N_1$ will emit a photon or will follow a non-radiative method to return to the ground state. In the meantime, the molecules $N_0$ with transition moments aligned in a direction orthogonal to the electric field of the laser light, i.e. to the first direction, or in a close direction during the laser interation, will continue to evolve freely and their orientations of transition moments become random again. In this scenario, the delay between two interations with excitation laser pulses is sufficiently long to allow the molecules $N_1$ returning to the ground state. The whole procedure is then repeated for the excitation with the polarization in the second direction. The two measurements of fluorescent light are independent, or incorelated in this scenario.

The second scenario presented on FIG. 8*b* has a delay between two interactions with the polarized excitation light which is shorter than the relaxation time or fluorescence lifetime, thus leading to the situation where the molecules $N_1$ are still largely in an excited state and will not interact with the second laser passage and most of interaction will be done by the molecules $N_0$. In this scenario, the particles "remember" the first interaction at the moment of the second interation.

With reference to FIGS. 9a to 9d, the excitation laser pulses, for example Gaussian laser pulses, emitted by the laser are characterized by their respective amplitudes ($\Theta_1$, $\Theta_2$) and standard deviations ($\sigma_1$, $\sigma_2$) characterizing the pulse duration. The fluorescence signals emitted by a particle hit by a laser pulse represent the convolution of the excitation laser pulse with an exponential decay, which includes measurement system response and particle response. FIGS. 9a to 9d represent four typical cases of time-resolved fluorescence signals emitted by particles hit twice by an excitation laser pulse: short lifetime for both excitation pulses and low fluorescence anisotropy in FIG. 9a, short lifetime for both excitation pulses and high fluorescence anisotropy in FIG. 9b, long lifetime for both excitation pulses and low fluorescence anisotropy in FIG. 9c, and long lifetime for both excitation pulses and high fluorescence anisotropy in FIG. 9d.

Figure 8A:
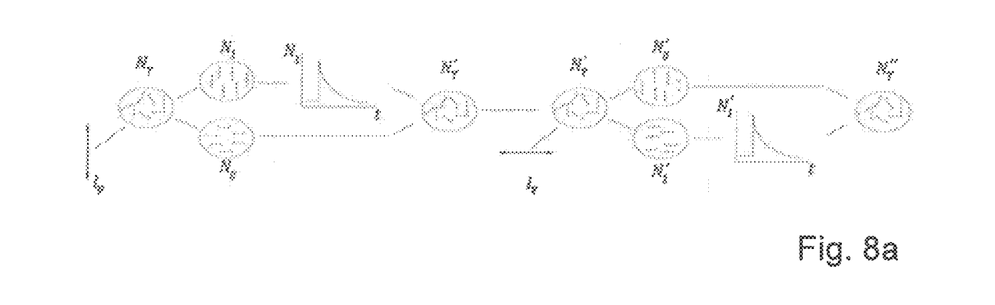
FIGS. 8a and 8b schematically illustrate two general cases where fluorescent molecules have a typical lifetime respectively shorter and longer than the time between two interactions with the laser pulse.

To characterize the main properties of fluorescence signals, the following expression can be used for anisotropy:

$$r(t) = \frac{I_{d1}(t) - I_{d2}(t)}{I_{d1}(t) + I_{d2}(t)} = r_0 e^{-\frac{t}{\theta}}$$

Where $r_0$ is anisotropy value at $t=0$; $\theta$ is correlation time. This definition of anisotropy is to be applied for the scenario described in relation with FIG. 8a. The maximum of anisotropy is then estimated by the following expression:

$$r_0 = \frac{I_{01} - I_{02}}{I_{01} + I_{02}}$$

Figure 8B:
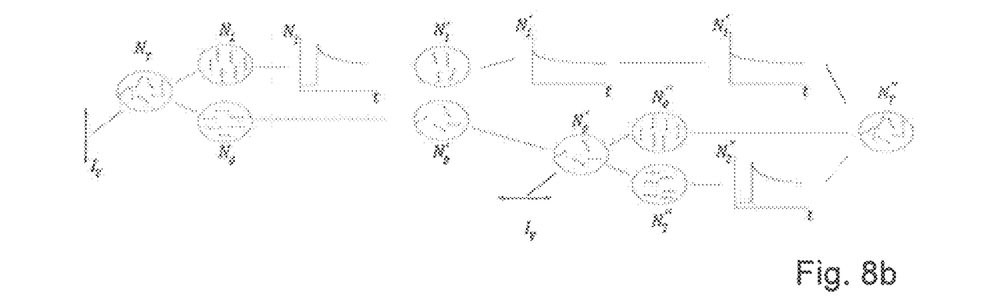
Figure 9A:
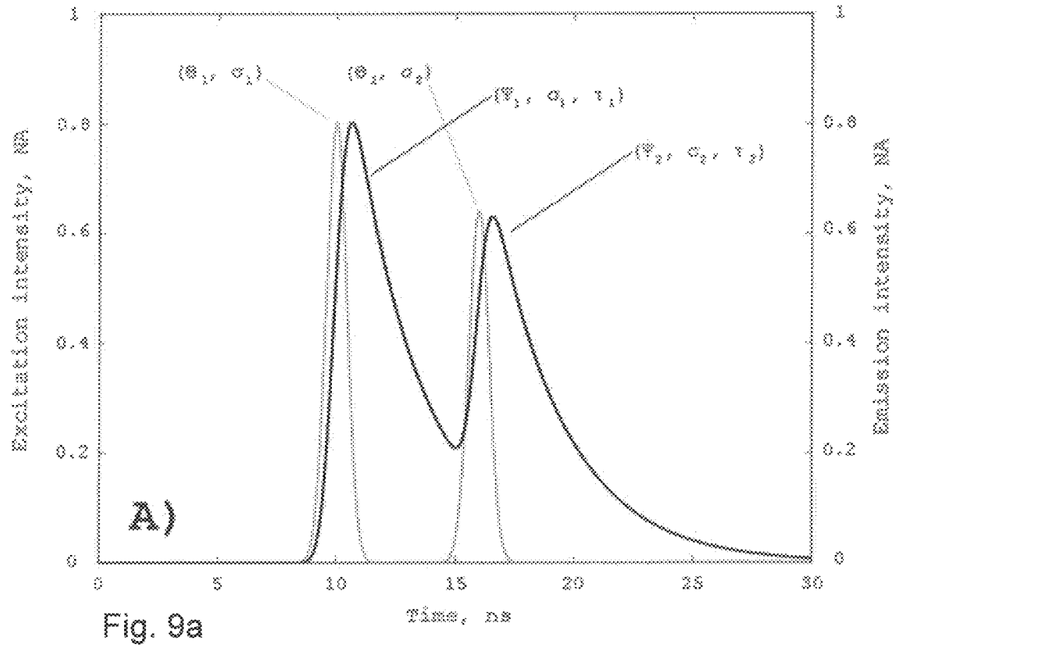
FIGS. 9a to 9d are representing four general cases where the fluorescent molecules have a typical lifetime shorter and longer than the time between two interactions with the laser pulse and the fluorescence anisotropy is strong and weak.
Figure 9B:
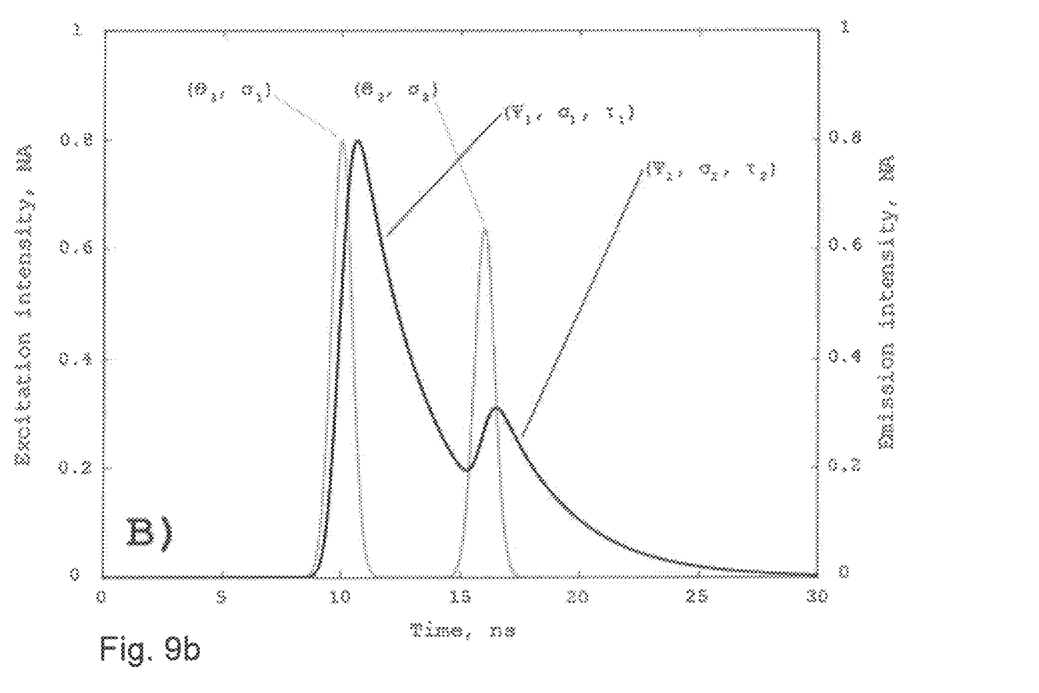
Figure 9C:
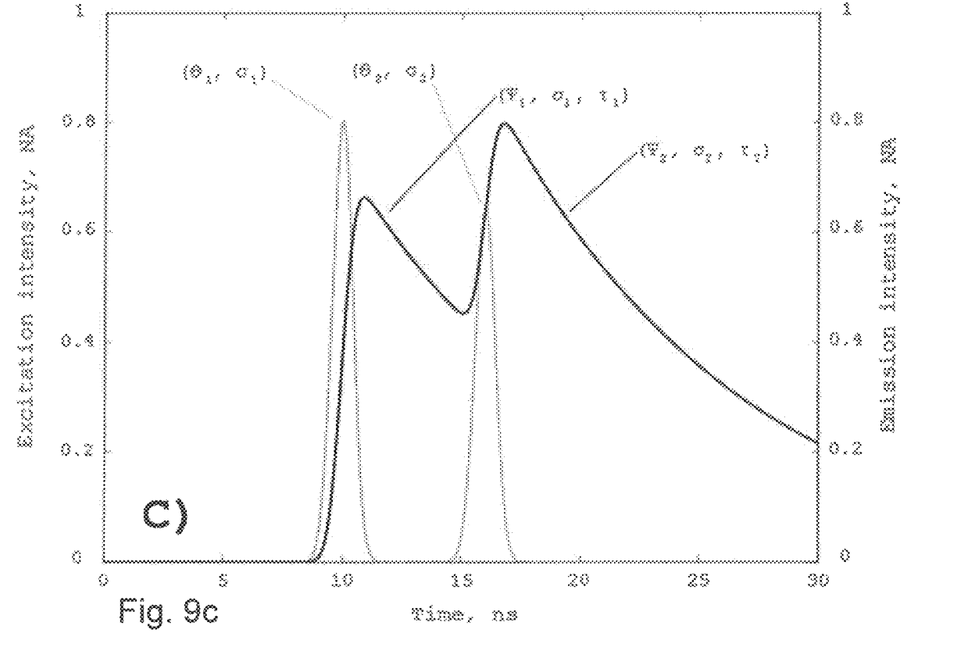
Figure 9D:
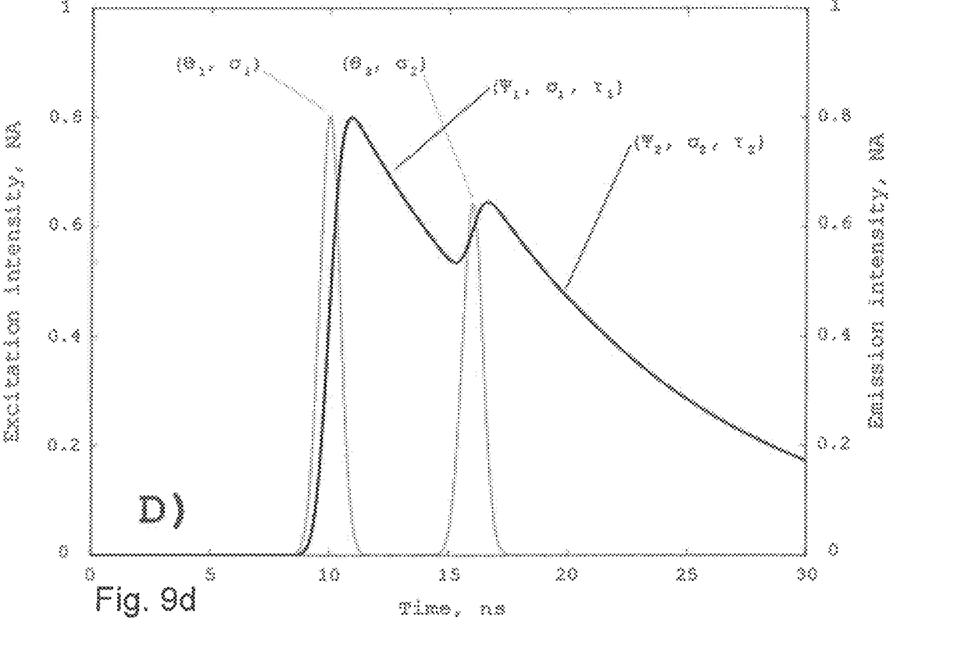

For the second scenario illustrated on FIG. 8b, no simple and direct expression can be given because anisotropy estimation will be largely influenced by the correlation between the two successive interactions. To extract the decay times $\tau_1$, $\tau_2$, the measured signal needs to be deconvolved with the know excitation pulse. The system response of the device is preferably much faster than the decay times. In case the system response is comparable to the decay times, the deconvolution must be made with a reference signal like light scattering without fluorescence to take into account the full response of the system.

Based on these determined parameters, an advanced characterization of sample fluorescence can be provided. The total fluorescence as a function of wavelength is expressed as:

$$I(\lambda, t) = I_{01}(\lambda) \cdot e^{-\frac{t}{\tau_1(\lambda)}} + I_{02}(\lambda) \cdot e^{-\frac{t}{\tau_2(\lambda)}}$$

The mean fluorescence lifetime of the sample as a function of wavelength is given by:

$$\tau(\lambda) = \frac{\tau_1(\lambda) + \tau_2(\lambda)}{2}$$

The fluorescence lifetime anisotropy to two polarizations of the excitation laser pulses as a function of wavelength is given by:

$$A_\tau(\lambda) = \frac{|\tau_1(\lambda) - \tau_2(\lambda)|}{\tau_1(\lambda) + \tau_2(\lambda)}$$

According to the method of the invention, an individual fluid-borne particle 9 to be characterized interacts within a short time delay with two successive laser pulses of different polarization. Using a fast sampling first optical spectrometer 4, this allows obtaining a time-resolved representation of the fluorescence of the particle 9 for each interaction. The intensity and decay of fluorescent light at each interaction and their comparison allows determining the lifetime and fluorescence anisotropy for each fluorescent excited molecule. As demonstrated above, the determination of these parameters allows determining the nature of the fluorescent molecules present in the excited fluid-borne particle, in particular their size, and thereby allows a precise characterization of said fluid-borne particle 9.

Figure 10A:
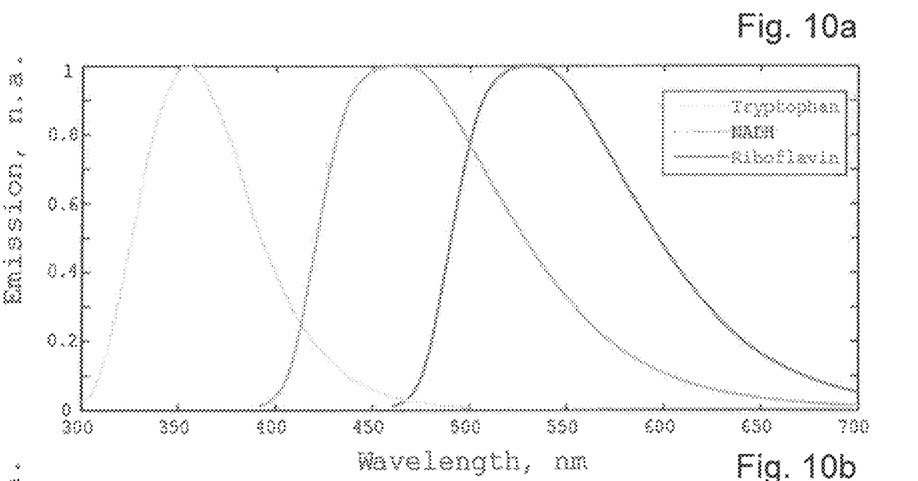
FIGS. 10a and 10b are representations of typical spectrally-resolved laser-induced fluorescence and absoption of some common endogen fluorophores.
Figure 10B:
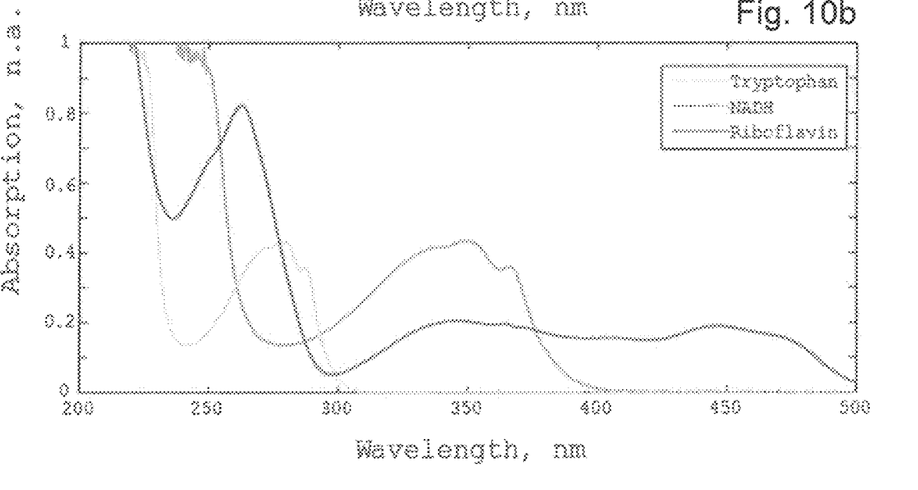

FIG. 10a shows an example of spectrally resolved results provided by the second optical spectrometer 5, which captures the entire fluorescent light emitted during both interactions of the laser pulses with the particles over a large spectrum. Three spectra of typical endogen fluorophores (tryptophan, Nicotinamide Adenine Dinucleotide reduced NADH, Flavin group) are illustrated. This result thus allows a clear distinction of these molecules in the particle thanks to different emission. Depending on the application, one can also adjust the spectral ranges of interest in the first optical spectrometer 4. FIG. 8b gives a typical abortion spectra of these fluorophores. This information may be helpful to better choose the excitation wavelength, which is the emission wavelength of the laser 6.

In embodiments, the device of the invention further comprises a second laser that emits a continuous laser beam towards the fluid flow, thereby forming a detection volume upstream from the measurement volume. A photodetector detects fluid-borne particles as they cross the detection volume by capturing laser light scattered by said particles in the detection volume. Optionally, the information provided by the photometer allows a first estimation of the nature of the individual particles, for example through the determination of their size, their shape, and or their surface texture.

Figure 11A:
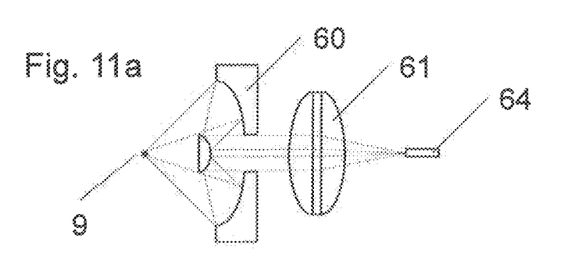
FIGS. 11a to 11c are representations of different device geometries for collecting fluorescent light emitted from individual particles into an optical fiber.
Figure 11B:
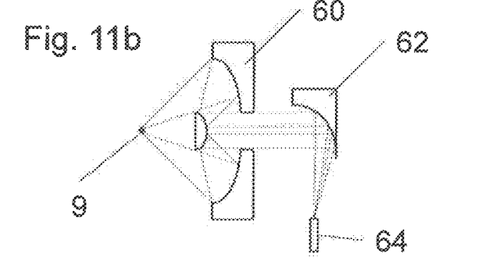
Figure 11C:
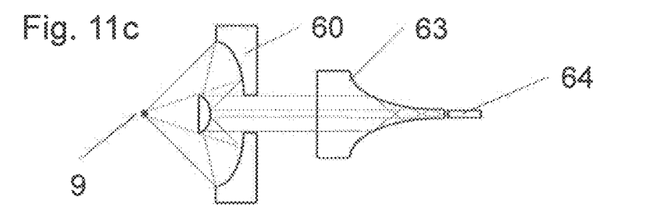

FIGS. 11a to 11c shows a further, preferred, embodiment of the invention where the device comprises a fluorescent light coupling means 61, 62, 63 in order to simplify its implementation.

More particularly, it is useful to couple the fluorescent light from particles 9 into an optical fiber 64, preferably a single optical fiber, to transport the light towards spectrometer. This allows a good mechanical separation of light collecting and light measuring elements. In order to do so, i.e. to collect fluorescent light emitted from individual particles 9 into an optical fiber 64, one add an element preferably made of transparent glass which is shaped in a way that all light coupled from the larger diameter side is guided to the lower diameter side by effect of total internal reflection. Among a plurality of geometries, three different geometries are preferred:
- a reflective objective lens 60 with infinite back-focal length conjugated with an optical lens 61,
- a reflective objective lens 60 with infinite back-focal length conjugated with parabolic reflector 62, or a reflective objective lens 60 with infinite back-focal length conjugated with an optical taper 63.

If a particle of interest is detected as it crosses the detection volume, a corresponding signal is sent for example to a controller of the device that triggers the emission of a laser pulse in the measurement volume for a more precise characterization of the particle of interest, thereby allowing a targeted emission of laser pulses in the measurement volume rather than a random one.

The invention claimed is:

1. Measurement device for the detection and/or characterization of fluid-borne particles, the measurement device comprising:
   means for producing a flow of fluid along a fluid flow path;
   a laser positioned for emitting pulses of laser light polarized in a first direction of polarization along a first optical path, in a measurement volume of the fluid flow path, each of said pulses having a pulse duration;
   means for directing pulses of laser light polarized in a second direction of polarization in said measurement volume along a second optical path, wherein said second direction of polarization and said second optical path are different from said first direction of polarization and said first optical path;
   a first optical spectrometer for capturing fluorescent light emitted by individual fluid-borne particles in said measurement volume and measuring intensity of said captured fluorescent light at at least one determined wavelength at a sampling rate of at least three samples per said pulse duration;
   wherein said means for directing are configured such that they direct from a different position relative to said laser said pulse of laser light polarized in said second direction of polarization in said measurement volume each time a pulse of laser light emitted by said laser and polarized in said first direction has crossed said measurement volume, a time delay between a moment of crossing said measurement volume by said pulse emitted by said laser and a moment of crossing said measurement volume by said pulse directed by said means for directing is longer than said pulse duration and shorter than a travel time of the fluid in said measurement volume, and wherein means is configured for collecting pulses of laser light emitted by said laser after they have crossed said measurement volume and redirecting them towards said measurement volume again, and for altering the polarization of the light of said pulses from said first direction of polarization to said second direction of polarization before redirected pulses reach said measurement volume again.

2. Measurement device according to claim 1, wherein said second direction of polarization is perpendicular to said first direction of polarization.

3. Measurement device according to claim 1, wherein said means for producing a flow of fluid is a nozzle for producing a laminar flow of air with a flow path beyond the nozzle.

4. Measurement device according to claim 1, wherein said means for producing a flow of fluid comprises a transparent tube for producing a flow of liquid with a flow path along said tube.

5. Measurement device according to claim 1, wherein said means for directing are a passive optical system.

6. Measurement device according to claim 1, wherein said means for directing are passive optical elements, comprising:
   a first optical mirror located opposite said laser on an other side of said measurement volume for reflecting pulses of laser light emitted by said laser after they have crossed said measurement volume;
   a second optical mirror for reflecting pulses of laser light reflected by said first optical mirror and directing them in said measurement volume;
   an optical wave plate for rotating the direction of polarization of the laser light of said pulses by 90°, said optical wave plate being located on the path of laser pulses, either between said measurement volume and said first optical mirror, or between said first optical mirror and said second optical mirror, or between said second optical mirror and said measurement volume.

7. Measurement device according to claim 1, wherein said first optical spectrometer is configured to measure intensity of said collected fluorescent light at three different wavelengths.

8. Measurement device according to claim 1, wherein said first optical spectrometer is configured for sampling said collected fluorescent light at a sampling frequency greater or equal to 500 MSPS (Mega samples per second).

9. Measurement device according to claim 8, wherein said first optical spectrometer is configured for sampling said collected fluorescent light at a sampling frequency greater or equal to 1 GSPS (Giga samples per second).

10. Measurement device according to claim 1, further comprising a second additional optical spectrometer to the first optical spectrometer for capturing fluorescent light emitted by individual fluid-borne particles in said measurement volume and determining an optical spectrum of said captured fluorescent light over a broad frequency range.

11. Measurement device according to claim 1, further comprising: an element adapted to guide all light coupled from a larger diameter side to a lower diameter side by effect of total internal reflection, and having at least one structure comprised in a group of a reflective objective lens with infinite back-focal length conjugated with an optical lens, a reflective objective lens with infinite back focal length conjugated with parabolic reflector, or reflective objective lens with infinite back focal length conjugated with an optical taper.

12. Measurement method for the detection and/or characterization of fluid-borne particles, the measurement method comprising the steps of:
    producing a flow of fluid along a fluid flow path,
    emitting a pulse of laser light from a laser polarized in a first direction of polarization along a first optical path, in a measurement volume of the fluid flow path, said pulse having a pulse duration,
    collecting fluorescent light emitted by individual fluid-borne particles in said measurement volume when hit by said pulse of laser light polarized in said first direction of polarization and filtered by a linear polarizer, and measuring an intensity of said collected fluorescent light at at least one determined wavelength at a sampling rate of at least three samples per fluorescence decay duration,
    directing a pulse of laser light along a second optical path polarized in a second direction of polarization from a different position relative to said laser in said measurement volume, wherein said second direction of polarization is different from said first direction of polarization and said second optical path is different from said first optical path, such that a time delay between a moment of crossing said measurement volume by said pulse of laser light polarized in said first direction of polarization and a moment of crossing said measurement volume by said pulse of laser light polarized in said second direction of polarization is longer than said pulse duration and shorter than a travel time of the fluid in said measurement volume, wherein the step of directing comprises collecting said pulse of laser light polarized in a first direction of polarization after it crossed said measurement volume and redirecting it towards said measurement volume again, and rotating the polarization of the light of said pulse of laser light polarized in a first direction from said first direction of polarization to said second direction of polarization before said pulse reaches said measurement volume again, capturing fluorescent light emitted by individual fluid-borne particles in said measurement volume when hit by said pulse of laser light polarized in said second direction of polarization and filtered by a linear polarizer, and measuring an intensity of said captured fluorescent light, filtered with a linear polarizer, at said at least one determined wavelength at a sampling rate of at least three samples per said pulse duration.

13. Measurement method according to claim 12, wherein said second direction of polarization is perpendicular to said first direction of polarization.

14. Measurement method according to claim 12, wherein said fluid is air or liquid.

15. Measurement method according to claim 12, wherein said step of directing comprises:

reflecting said pulse of laser light polarized in a first direction of polarization after it crossed said measurement volume with a first optical mirror;

reflecting said pulse of laser light reflected by said first optical mirror and directing it in said measurement volume with a second optical mirror;

rotating the direction of polarization of the laser light of the pulse by 90° with an optical wave plate located on the path of the pulse of laser light, either between said measurement volume and said first optical mirror, or between said first optical mirror and said second optical mirror, or between said second optical mirror and said measurement volume.

16. Measurement method according to claim 12, wherein said first optical spectrometer is configured to measure intensity of said captured fluorescent light at three different wavelengths.

17. Measurement method according to claim 12, wherein said first optical spectrometer is configured for sampling said captured fluorescent light at a sampling frequency greater or equal to 500 MSPS (Mega samples per second).

18. Measurement method according to claim 12, wherein said first optical spectrometer is configured for sampling said captured fluorescent light at a sampling frequency greater or equal to 1 GSPS (Giga samples per second).

19. Measurement method according to claim 12, wherein the steps of capturing and measuring further comprise determining an optical spectrum of said fluorescent light over a broad frequency range.

* * * * *